United States Patent [19]

Katoh et al.

[11] Patent Number: 4,978,215
[45] Date of Patent: Dec. 18, 1990

[54] IMAGE PROJECTING SYSTEM

[75] Inventors: Osami Katoh, Sagamihara; Hideaki Kusano, Machida, both of Japan

[73] Assignee: Minolta Camera Kabushiki Kaisha, Osaka, Japan

[21] Appl. No.: 293,464

[22] Filed: Jan. 4, 1989

Related U.S. Application Data

[62] Division of Ser. No. 134,105, Dec. 17, 1987, Pat. No. 4,846,569.

[30] Foreign Application Priority Data

Dec. 19, 1986 [JP] Japan ................................ 61-303118
Dec. 19, 1986 [JP] Japan ................................ 61-303119
Dec. 19, 1986 [JP] Japan ................................ 61-303120

[51] Int. Cl.$^5$ ............................................ G03B 21/10
[52] U.S. Cl. .................................... 353/26 R; 353/74; 353/97
[58] Field of Search ................... 353/25, 26 R, 26 A, 353/DIG. 2, 95, 96, 74–78, 79

[56] References Cited

U.S. PATENT DOCUMENTS 4,110,020 8/1978 Johnson et al. ................. 353/26 A
4,755,046 7/1988 Hirose et al. ...................... 353/26 R

FOREIGN PATENT DOCUMENTS 55-18817 5/1980 Japan .
56-110924 9/1981 Japan .
60-242447 12/1985 Japan .
61-104443 7/1986 Japan .
630382 10/1949 United Kingdom ................. 353/95

Primary Examiner—Harry N. Haroian
Attorney, Agent, or Firm—Burns, Doane, Swecker & Mathis

[57] ABSTRACT

An image projecting system for irradiating a microfilm with light emitted from a light source and projecting an image recorded on the microfilm onto an image receptor such as a screen or a photosensitive drum, the image projecting system having a masking unit which is mounted in the body of the system removably. The masking unit contains a first masking portion which is for changing the range of the image advancing toward the image receptor through an optical path, in a first direction of the microfilm, and a second masking portion which is for changing the range of the image in a direction approximately perpendicular to the said first direction. These masking portions are disposed in close proximity to the microfilm. Thus, a desired range of the image recorded on the microfilm can be projected on the image receptor and the outer peripheral edge of the projected image is made sharp and clear by the above masking portions. Normal operation and other operations for maintenance can be done easily by removing the masking unit from the system body.

7 Claims, 6 Drawing Sheets

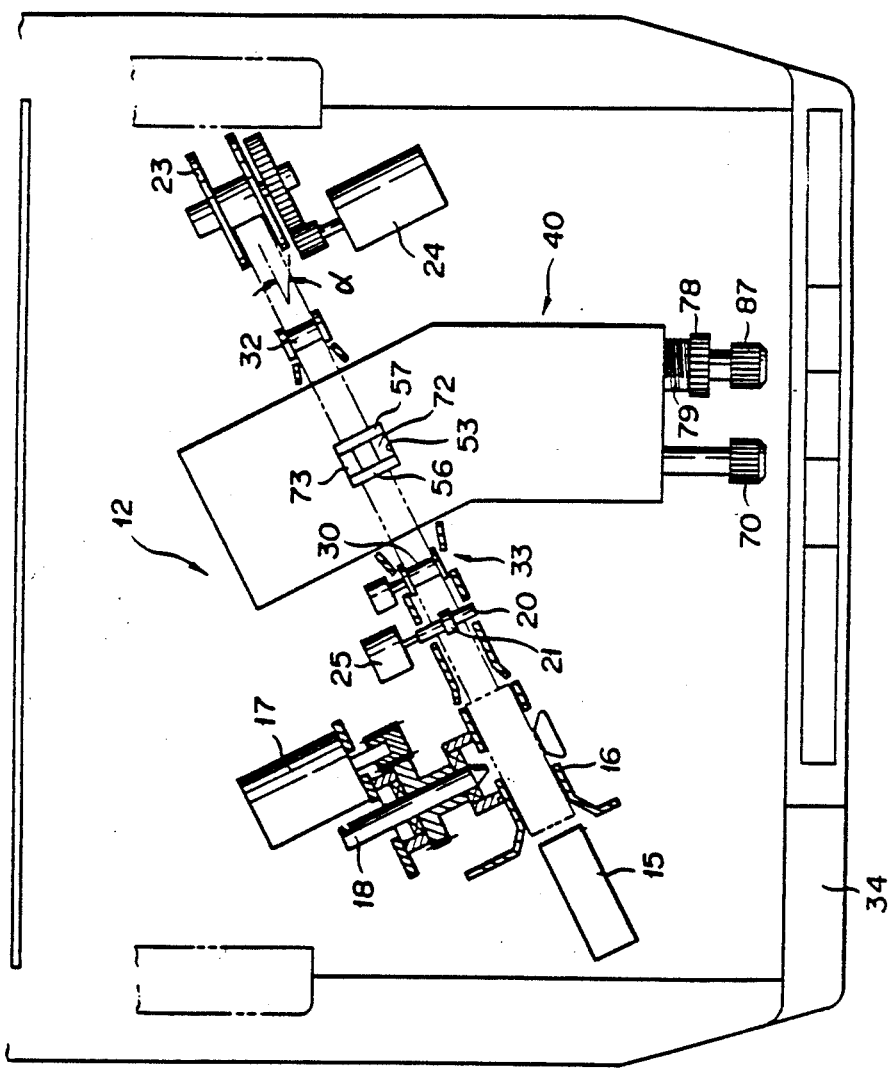

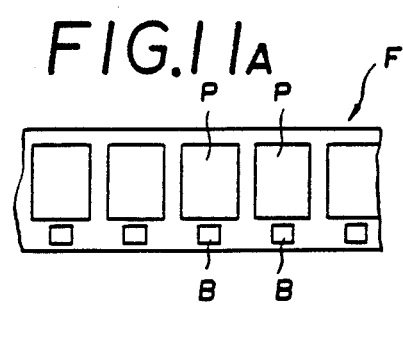
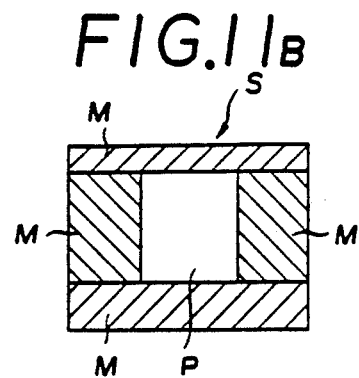
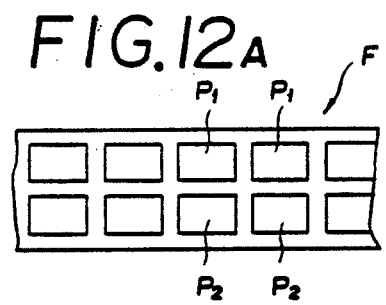
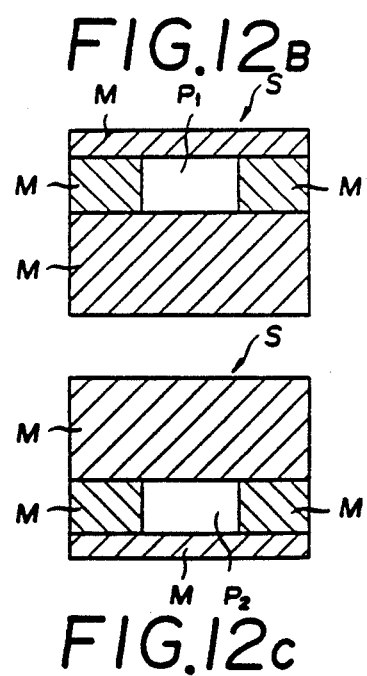

IMAGE PROJECTING SYSTEM

This application is a division, of application Ser. No. 134,105, filed Dec. 17, 1987, now U.S. Pat. No. 4,846,569.

BACKGROUND OF THE INVENTION

1. Field of the Invention

The present invention relates to an image projecting system for projecting an image on microfilm onto an image receptor on a larger scale. More particularly, it is concerned with an image projecting system such as a reader or a reader printer, having a masking unit for shielding an image area other than a desired image area of a microfilm and allowing only the desired image area to be projected onto an image receptor.

2. Description of the Prior Art

A reader is used for projecting a desired image onto a screen out of images recorded on microfilm, and a reader printer has a screen for the projection thereon of any image out of images recorded on microfilm and a copying machine for printing that image. Where an image projecting system, e.g. a reader or a reader printer, is used in a bank, images of a large number of checks, etc. are recorded at a high contraction rate on a single microfilm and a desired image is projected onto the screen. If necessary, that image is projected onto a photosensitive medium to make a copy thereof. In such an image projecting system, it is necessary that only the required portion out of many images recorded on the microfilm be projected onto the screen and copied.

Japanese Utility Model Publication No. 18817/80 discloses a reader which has a masking plate for projecting a desired image portion onto a screen out of image recorded on a microfich film and for shielding the other unnecessary portion. In the presence of such masking plate, the masked portion is indicated as being illegible on the screen, or unmasked and masked portions are indicated discriminatively.

Japanese Patent Laid Open No. 110924/81 discloses a reader printer having two masking plates which are disposed in positions adjacent to a photosensitive drum so that they can move toward and away from each other. These masking plates, which are movable axially of the photosensitive drum, are each interlocked with an indication plate which indicates a portion corresponding to the copying area of a screen.

Japanese Patent Laid open No. 242447/85 discloses a copying machine which has a sheet-like light shielding member capable of expanding and contracting in the longitudinal direction and a sheet-like light shielding member capable of expanding and contracting in the transverse direction, below an original-bearing table, for changing the copying region, whereby light from a lamp is directed to only the portion of an original according to the size thereof.

Japanese Utility Model Publication No. 104443/86 discloses a copying machine in which a sheet-like light shielding member formed with plural sizes of openings corresponding to the shapes of originals is provided below an original-bearing table, whereby an opening of a size matching the size of an original to be copied is positioned oppositely to the original and light is directed to the original through that portion.

Nevertheless, all of the above-mentined techniques have the problem that the masking range cannot adjust arbitrarily.

SUMMARY OF THE INVENTION

It is, an object of the present invention to provide an image projecting system which has a masking unit for shielding the portion than of an image other a desired portion a of image recorded on the microfilm.

It is another object of the present invention to provide an image projecting system which has first and second masking means, the first masking means having two masking members capable of moving in a conveyance direction of microfilm to adjust in the conveyance direction the range of an optical path through which an image of microfilm is passing, and the second masking means having two masking members capable of moving in a transverse direction of the microfilm to adjust in the transverse direction the range of the optical path.

It is another object of the present invention to provide an image projecting system in which an adjusting shaft connected to the two masking members of the first masking means to move them toward and away from each other, and an adjusting shaft connected to the two masking members of the second masking means to move them toward and away from each other, are each inclined at a predetermined angle relative to the conveyance direction of the microfilm.

It is a still further object of the present invention to provide an image projecting system in which microfilm delivered from a cartridge is conveyed in a direction inclined relative to the front face of the body of the image projecting system.

It is a still further object of the present invention to provide 1 projecting system having a masking unit which can be attached to and detached from the system body.

According to the present invention, there is provided an image projecting system for irradiating a microfilm with light emitted from a light source and projecting an image recorded on the microfilm onto through an optical projection path an image receptor, including: a microfilm conveying means; a first masking means having first and second masking members for masking a range of said optical projection path from the front side and the rear side, respectively, with respect to a conveyance direction of the microfilm, said first and second masking members being movable symmetrically with respect to a first predetermined datum line; a second masking means having third and fourth masking members for masking a range of said optical projection path from both sides in the direction perpendicular to said microfilm conveyance direction, said third and fourth masking members being movable symmetrically with respect to a second predetermined datum line; a first drive means for moving said first and second masking members forward and backward with respect to said first datum line; and a second drive means for moving said third and fourth masking members forward and backward with respect to said second datum line.

BRIEF DESCRIPTION OF THE DRAWINGS

FIG. 2 is a plan view showing a carrier portion of the reader printer of FIG. 1;

FIG. 11A is a plan view of a microfilm having blip marks;

FIG. 11B is a front view showing a masking operation for the microfilm;

FIG. 12A is a plan view of another microfilm; and

FIGS. 12B and 12C are front views showing masking operations for the microfilm of FIG. 12A.

DESCRIPTION OF THE PREFERRED EMBODIMENTS

Figure 1:
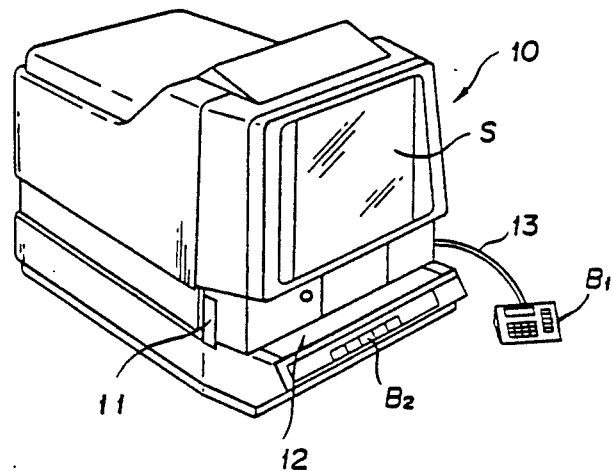
FIG. 1 is a perspective view showing an appearance of a reader printer embodying the present invention.

As shown in FIG. 1, a body 10 of a reader printer for the projection of images recorded on microfilm has a carrier portion 12 formed with an insertion or receiving port 11 and screen S for the projection thereon of images recorded on the microfilm. Further, the reader printer has an operating board B1 which is connected to the body 10 through a cable 13 and an operating board B2 which is provided on the front side of the body 10.

Figure 3:
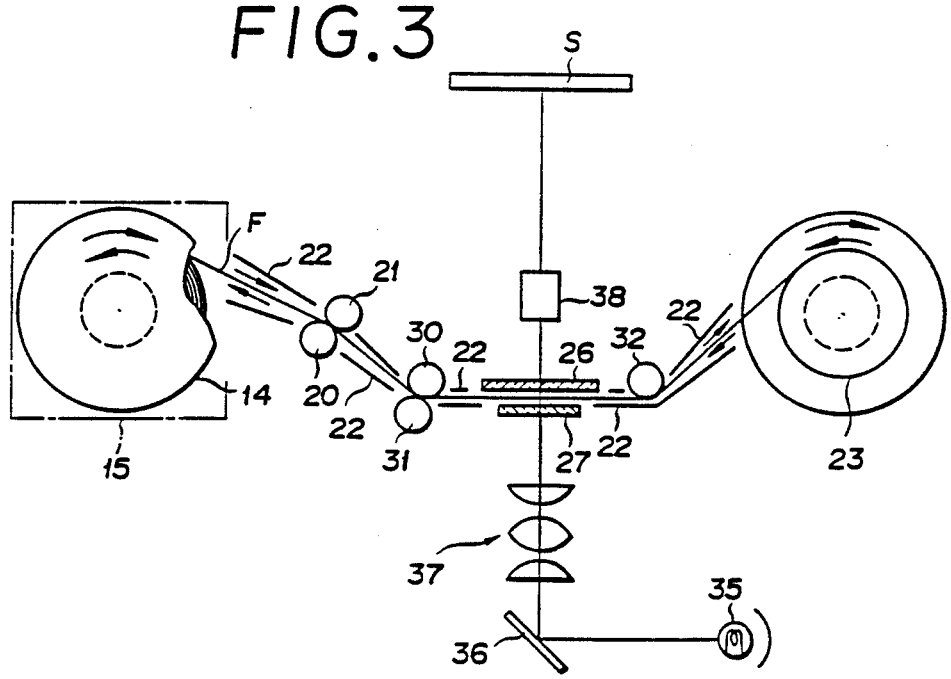
FIG. 3 is a schematic view showing a microfilm conveying path.

The carrier portion 12, as shown in FIGS. 2 and 3, is provided with a housing 16 for housing a cartridge 15 with a reel 14 incorporated therein, the reel 14 having a microfilm F wound thereon in the form of a roll. The cartridge 15 is loaded into the housing 16 from the insertion port 11 formed in the carrier portion 12. A shaft 18 which is rotated by a motor 17 and is movable toward and away from the cartridge 15, is attached to the housing 16. By the rotation of the shaft 18 the microfilm F in the cartridge 15 loaded in the housing 16 is moved while being guided by a guide 22 up to the position between a feed roller 20 and an auxiliary roller 21 both disposed downstream of the housing 16.

The guide 22 extends to a spool 23 which is driven by a motor 24, the motor 24 being mounted within the carrier portion 12 in a position spaced from the housing 16. When the fore end of the microfilm F reached the feed roller 20, the feed roller 20 is driven by a motor 25, whereby the microfilm is conveyed through transparent glass plates 26 and 27 up to the spool 23.

Further, as shown in FIGS. 2 and 3, the carrier portion 12 is provided with an encoder roller 31 which urges an auxiliary roller 30 through the microfilm F. The fed distance of the microfilm F is counted in terms of the number of revolutions of the encoder roller 31. Downstream of the upper and lower glass plates 26 and 27 is provided, a guide roller 32 in a position whose level is the same as that of the auxiliary roller 30.

The guide 22 constitutes a conveyance path 33 for forward and backward movement of the microfilm F, which film is moved forward and backward along the conveyance path 33 by forward and reverse rotation of the motors 17 and 24. The conveyance path 33 is inclined at a predetermined angle $\alpha$ with respect to a front portion 34 of the reader printer body 10, as shown in FIG. 2. Consequently, the microfilm F is conveyed in a direction with respect to the front portion 34 and so there is obtained a small-sized reader printer in which the width of the body 10 is relatively small in comparison with the conveyance distance of the microfilm F.

As shown in FIG. 3, light from a light source such as, for example, a lamp 35 is condensed by a group of condenser lenses 37 through a reflecting mirror 36 and then applied to the microfilm F positioned between the upper and lower glass plates 26 and 27, whereby an image recorded on the microfilm F is enlarged through a projection lens 38 and projected on the screen S which serves as an image receptor. For retrieving a predetermined image to be projected on the screen S, the operator operates the operating boards B1 and B2 to move the microfilm F forward and backward.

For printing the image seen on the screen S, the operator operates the operating boards B1 and B2 whereby the image on the microfilm F is projected onto a photosensitive drum (not shown) serving as an image receptor and exposed to light, then subjected to a known processing to take a copy thereof on sheet.

Figure 4:
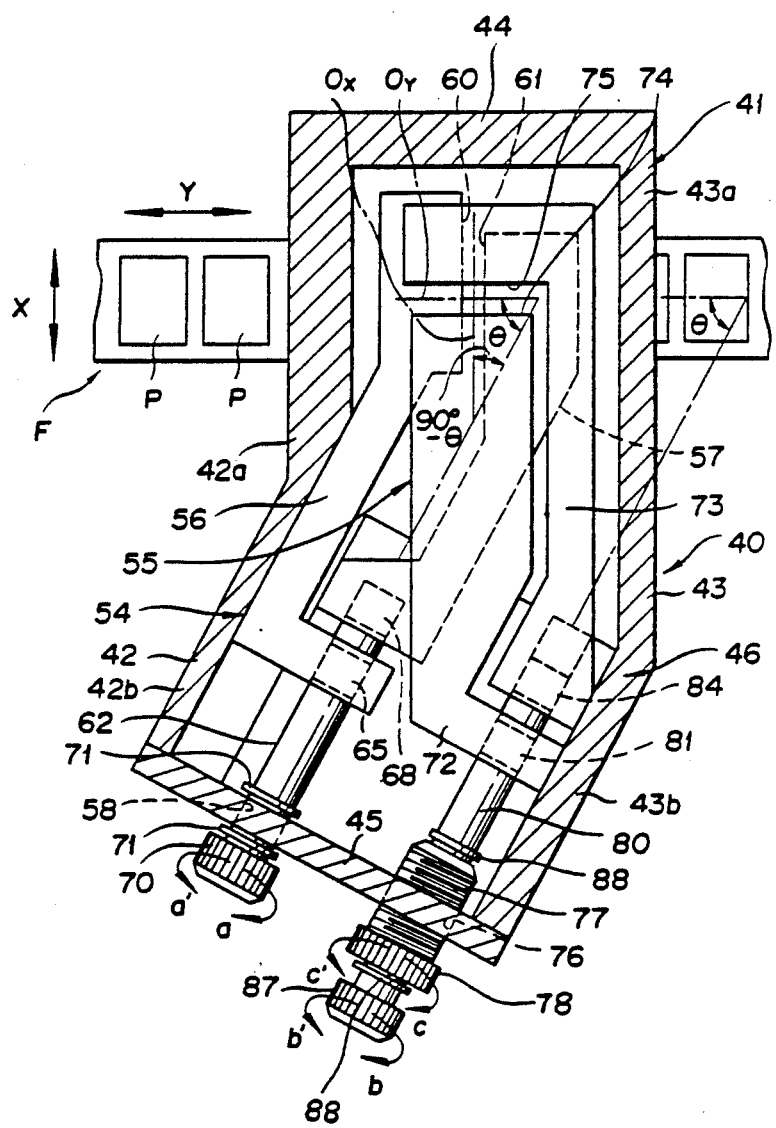
FIG. 4 is a sectional view of a masking unit shown in FIG. 2.
Figure 5:
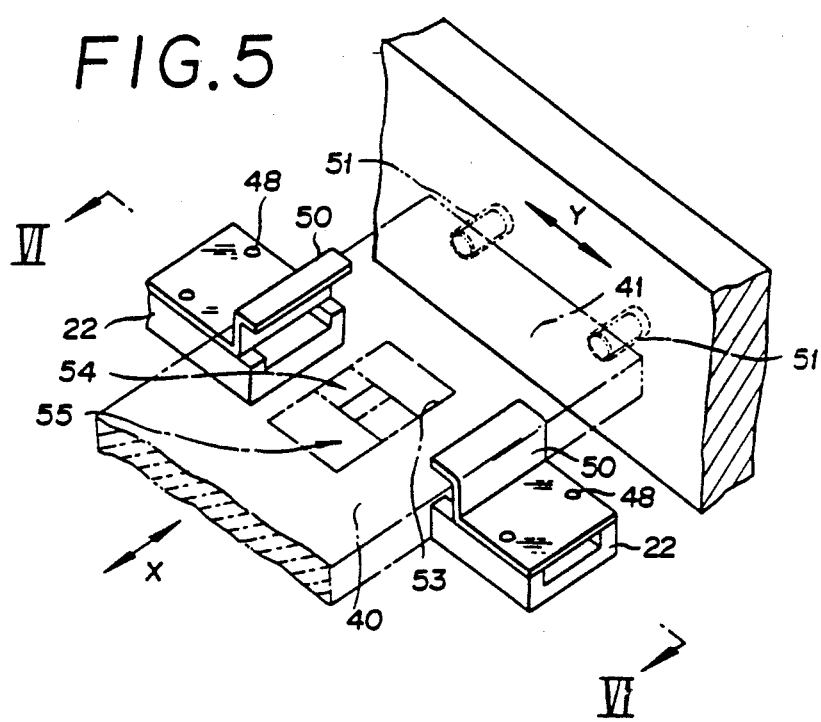
FIG. 5 is a perspective view showing means for mounting the masking unit.
Figure 6:
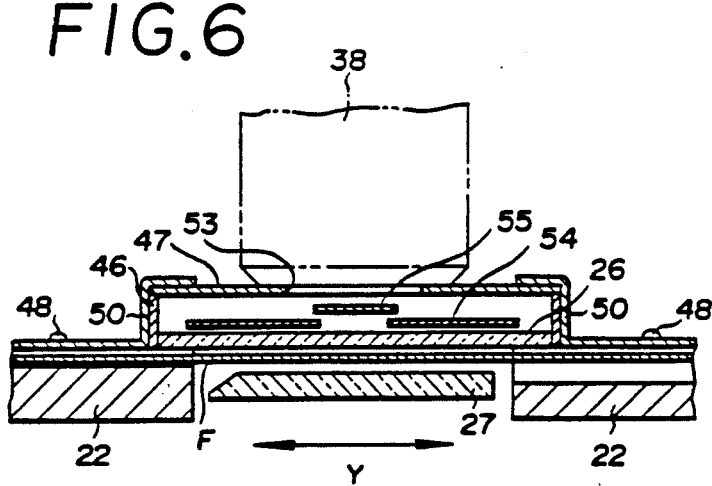
FIG. 6 is a sectional view taken along line VI—VI in FIG. 5.

Within the carrier portion 12 in the reader printer body 10 is removably mounted a masking unit 40 removably as shown in FIG. 2 to cover a portion other than a predetermined portion of images recorded on the microfilm F. The details of the masking unit 40 are shown in FIGS. 4 to 6.

The masking unit 40 is constituted by a unit case 41. The unit case 41 is composed of a frame 46 which comprises side portions 42, 43, a rear portion 44 and a front portion 45, a cover 47 mounted on the upper side of the frame 46, and a glass plate 26 mounted on the lower side of the same frame. The unit case 41, as shown in FIGS. 5 and 6, is mounted through retaining members 50 each fixed onto the guide 22 with bolts 48. For positioning the unit case 41 in the X direction in FIG. 5 when mounting on the guide 22, the carrier portion 12 has recesses to engage with stopper pins 51 adapted to abut the rear portion 44 of the unit case 41.

As illustrated, the upper glass plate 26 is fixed to the unit case 41, while the lower glass plate 27 is brought into pressure contact with the upper glass plate 26 through the microfilm F in a stopped condition of the film when projecting an image recorded on the film onto the image receptor. The upper glass plate 26 may be attached to the guide 22 without being fixed to the unit case 41. Further, the unit case 41 may be attached to the lower side of the guide 22 so that the cover 47 thereof is opposed to the lower glass plate 27. Any of such structures may be adopted if only at least one of the upper and lower glass plates is urged toward the other glass plate through the microfilm F.

The side portions 42 and 43 of the unit case 41 are respectively composed of rear portions 42a and 43a extending in the transverse direction of the microfilm F and front portions 42b and 43b which are bent with respect to the rear portions.

As shown in FIGS. 5 and 6, the cover 47 of the unit case 41 is formed with an opening 53 for directing the light from the light source 35 to the projection lens 38. The range of an optical path incident on the projection lens 38 is defined by the opening 53. Within the masking unit 40 are incorporated a first masking means 54 which is for changing the range of the light incident on the projection lens 38 through the opening 53, into the conveyance direction of the microfilm F, i.e., Y direction, as shown in FIG. 4 and a second masking means 55 which is for changing the said light range into the transverse direction of the microfilm F, i.e., X direction.

The first masking means 54 has a first masking member 56 mounted slidably along the front part 42b of the side portion 42 and a second masking member 57 mounted within the unit case 41 slidably in parallel with the first masking member 56. The distal ends of the masking members 56 and 57 are formed with masking edges 60 and 61, respectively, which are each in parallel with an X datum line, Ox, extending in the transverse direction of the microfilm F, as shown in FIGS. 4 and 7.

For changing the spacing between the masking edges 60 and 61, an adjusting shaft 62 is rotatably fitted through a hole 58 formed in the front portion 45 of the frame 46. The adjusting shaft 62 is inclined at an angle of $\theta$ with respect to the conveyance direction of the microfilm F and it is formed with an external thread portion 63 which is engaged with an internal thread portion 65 of a bearing portion 64 provided in the first masking member 56, and also formed with an external thread portion 66 which is engaged with an internal thread portion 68 of a bearing portion 67 provided in the second masking member 57. The external thread portions 66 and 63 are of opposite threads. For example, if the external thread portion 66 is of right-handed threads, the external thread portion 63 of left-handed threads. The adjusting shaft 62 is provided with a knob 70 at the distal end thereof and a stopper 71 such as a washer is fixed to the shaft 62 to prevent the shaft from moving in the axial direction.

Figure 7:
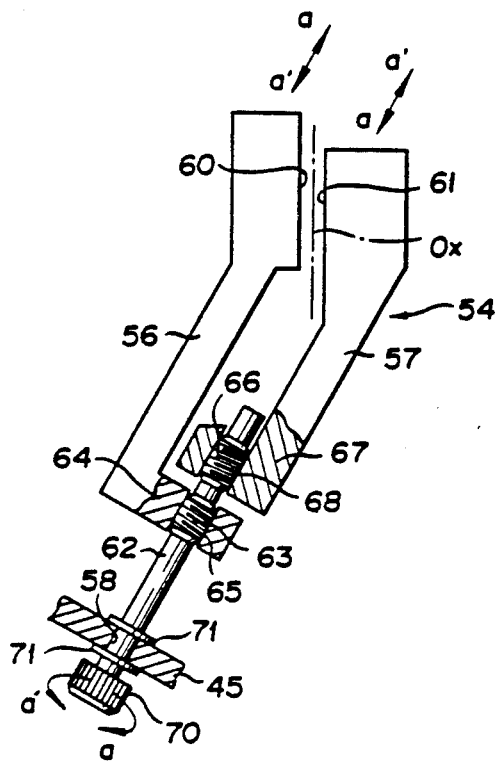
FIG. 7 is a plan view, partly broken away, showing a first masking means.

For example, therefore, if the external thread portions 66 and 63 are of right- and left-handed threads, respectively, then when the adjusting shaft 62 is turned in a clockwise direction indicated at the reference mark "a" as shown in FIGS. 4 and 7, the bearing portion 64 moves toward the rear end of the shaft 62, while the bearing portion 67 moves toward the front end of the shaft, so that the masking member 56 moves in the direction of arrow a shown in FIG. 7 and the masking edge 60 approaches the datum line Ox in parallel relation thereto while moving upwards in FIGS. 4 and 7. At the same time, the masking member 57 moves in the direction of arrow a and the masking edge 61 approaches the fiducial line Ox in parallel relation thereto while moving downwards. As a result, the width in the conveyance direction of the microfilm F, namely, the width in the Y direction, is narrowed by the first masking means 54.

Conversely, when the knob 70 is turned in the direction of arow a', namely, in a counterclockwise direction, the masking members 56 and 57 move in the direction of a', so that the masking edges 60 and 61 move away from the fiducial line Ox while being held in parallel relation to the X datum line Ox.

Figure 8:
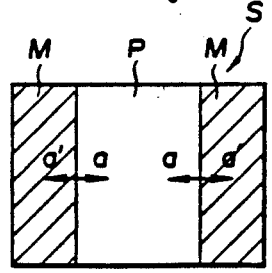
FIG. 8 is a front view showing the operation of the first masking means.

Consequently, when the knob 70 is turned in the clockwise direction, the hatched masking areas in FIG. 8 expand as indicated with arrow a and so the length of the image P projected on the screen S serving as an image receptor becomes smaller, that is, the masked portion becomes broader. Conversely, when the knob 70 is turned in the counterclockwise direction, the hatched masking areas in FIG. 8, indicated at M, are reduced as shown with arrow a' and so the image P projected on the screen S becomes longer, that is, the masked portion becomes narrower.

The second masking means 55 has a third masking member 72 mounted slidably along the front portion 43b of the side wall 43 and a fourth masking member 73 which is mounted within the unit case 41 slidably in parallel with the third masking member. The distal ends of the masking members 72 and 73 are formed with masking edges 74 and 75 which are parallel to a Y datum line Oy extending in the conveyance direction of the microfilm F as shown in FIGS. 4 and 8.

As noted above and shown in FIG. 6, since the masking members of the masking means 54 and 55 are positioned near the microfilm, a boundary line between the projected portion and the masked portion is projected sharply on the image receptor such as the screen S or the photosensitive drum.

In the front portion 45 of the frame 46 is fitted a bearing member 79 having a knob 78 and an external thread 77 which is engaged with an internal thread 76 formed in the front portion 45.

For changing the spacing between the masking edges 74 and 75, an adjusting shaft 80 is rotatably supported by the bearing member 79 through a hole 69 formed in the bearing member 79. The adjusting shaft 80 is inclined at an angle of $\theta$ with respect to the moving direction of the microfilm F and is parallel to the adjusting shaft 62. An external thread 81 is formed on the adjusting shaft 80 and it is engaged with an internal thread poriton 83 of a bearing portion 82 provided in the third masking member 72, and an external thread portion 84 is also formed on the adjusting shaft 80 and it is engaged with an internal thread portion 86 of a bearing portion 85 provided in the fourth masking member 73. The external thread portions 81 and 84 are of threads opposite to each other. For example, if the external thread poriton 81 is of left-handed threads, the external thread portion 84 is of right-handed threads. The distal end of the adjusting shaft 80 is provided with a knob 87 and a stopper 88 such as a washer is fixed to the shaft 80 to prevent the shaft 80 from moving axially with respect to the bearing member 79 and hence the front portion 45.

Figure 9:
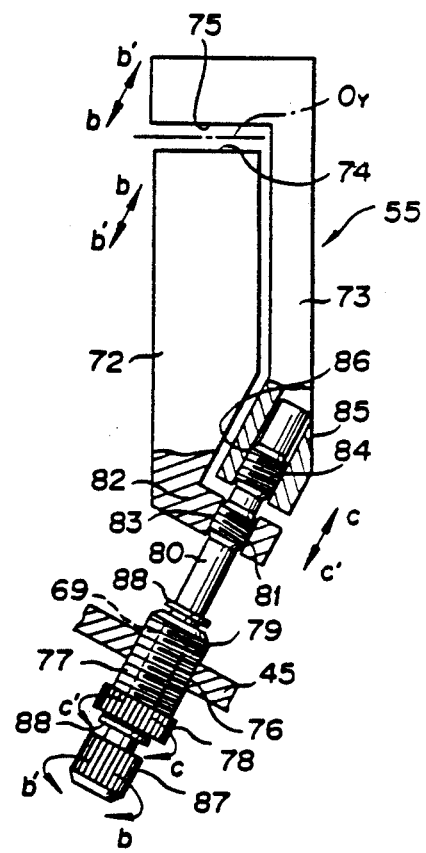
FIG. 9 is a plan view, partly broken away, showing a second masking means.

For example, therefore, if the external thread portions 81 and 84 are of left- and right-handed threads, respectively, then when the adjusting shaft 80 is turned in a clockwise direction indicated by the reference mark "b" with the knob 87, as shown in FIGS. 4 and 9, the bearing portion 82 of the masking member 72 moves toward the rear end of the shaft 80, while the bearing portion 85 of the masking member 73 moves toward the front end, so that the masking member 72 moves in the direction of arrow b in FIG. 9 and the masking edge 74 approaches the datum line Oy in parallel relation thereto while moving in the horizontal direction in FIGS. 4 and 9. At the same time, the masking member 73 moves in the direction of arrow b and the masking edge 75 approaches the datum line Oy in parallel relation thereto while moving in the horizontal direction. Thus, the size in the transverse direction of the microfilm F, that is, the width in the X direction, is reduced by the second masking means 55.

Conversely, when the knob 87 is turned in the direction of arrow b', namely, in the counterclockwise direction, the masking members 72 and 73 move in the direction of arrow b', so the masking edges 74 and 75 move away from the Y datum line Oy while being held in parallel with the datum line.

A support member (not shown) may be provided in the unit case 41 and the two masking members 56 and 57 of the first masking means 54 may be slidably supported thereby provided they move at an angle of $\theta$ with respect to the moving direction of the microfilm F. Likewise, the two masking members 72 and 73 of the second masking means 55 may be slidably supported by a similar support member provided they move at an angle of $\theta$ with respect to the film moving direction.

Figure 10:
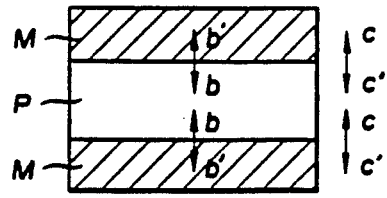
FIG. 10 is a front view showing the operation of the second masking means.

As a result, when the knob 87 is turned in the clockwise direction, the hatched masking areas indicated by M become wider as indicated by arrow b so the width of the image P projected on the screen S which serves as an image receptor becomes larger, as shown in FIG. 10; that is, the masked portion becomes broader. Conversely, when the knob 87 is turned in the counterclockwise direction, the hatched masking areas M are reduced as indicated by arrow b' in FIG. 10 and so the width of the image P projected on the screen S becomes larger; that is, the masked portion is reduced.

As noted above, the bearing member 79 which supports the adjusting shaft 80 rotatably is threadedly engaged with the front portion 45 of the unit case 41, so that when the knob 78 provided on the bearing member 79 is turned in the clockwise direction as indicated by arrow c in FIG. 9, the bearing member 79 moves obliquely upwards in FIG. 9, if the external thread portion 81 is of right-handed threads. As a result, the adjusting shaft 80 and the masking members 72, 73 also move in the same direction and so the Y datum line Oy changes upwards in FIG. 9. In this case, however, the spacing between the masking edges 74 and 75 of the masking members 72 and 73 does not change, and on the screen S serving as an image receptor, the masking areas M as a whole move upwards in FIG. 10 as indicated by arrow c with respect to the projected image P while maintaining a predetermined spacing.

When the knob 78 is turned in the counterclockwise direction, namely, in the direction of arrow c', the knob 78 of the bearing member 79 moves away from the front portion 45 and the masking members 72 and 73 also move in the direction of arrow c'. As a result, on the screen S the masking areas M as a whole move in the direction of arrow c' with respect to the image P while maintaining a predetermined spacing.

The adjusting shaft 80 is supported by the bearing 79 so as to be movable axially. The adjusting shaft 62 may be supported by a similar bearing member. In this case, the X datum line Ox can be changed in the conveyance direction of the microfilm F.

As mentioned above, the adjusting shaft 62 is turned through the knob 70 to move the masking members 56 and 57 in the direction parallel to the axis of the shaft 62, thereby allowing the masking edges 31 and 32 to move toward and away from the X datum line Ox. To this end, the shaft 62 is inclined at an angle of with respect to the conveyance direction of the microfilm F as shown in FIG. 5. Likewise, the adjusting shaft 80 is also inclined at an angle of $\theta$ with respect to the conveyance direction of the film. Thus, the X datum line Ox is inclined at an angle of 90° minus $\theta$ with respect to the axis of the adjusting shaft 62, while the Y datum line Oy is inclined at an angle of $\theta$ respect to the axis of the shaft 80. The angle $\theta$ is set at 60°.

In order that the operator's operation for the knobs 70, 78 and 87 can be done from the front side of the reader printer body 10 shown in FIGS. 1 and 2, the masking unit 40 is mounted in the body 10 so that the adjusting shafts 62 and 80 face longitudinally of the body 10, so the conveyance direction of the microfilm F is inclined at the angle $\alpha$ which is 90° minus $\theta$, i.e. 30°, with respect to the front face of the body 10, whereby the width of the reader printer body 10 can be made small as compared with the length of the film conveyance path.

The operator's operation for the knobs 70, 78 and 87 can also be done from a side of the reader printer body 10. In this case, the microfilm conveyance path is inclined with respect to the side face of the reader printer body 10. The angle $\theta$ may be set at any other value than 60°.

The following description is now provided about the procedure for projecting a desired image recorded on the microfilm F and copying the image using the reader printer of the present invention.

The microfilm F is delivered from the cartridge 15 located in the housing 16 which is provided within the carrier portion 12 in the reader printer body 10, and the light from the lamp 35 is directed to the film, whereby an image P recorded on the microfilm F is projected on the screen S and seen. The portion to be projected on the screen S is adjusted by operating the first and second masking means 54 and 55 both provided within the masking unit 40, to change the spacing between the masking edges 60 and 61 as well as the spacing between the masking edges 74 and 75. In projecting the image P on the screen S, the distance in the conveyance direction of the microfilm F is adjusted by the masking members 56 and 57 and the distance in the transverse direction of the film is adjusted by the masking members 72 and 73.

For printing the image P with the desired range of area projected, the image is projected on the photosensitive drum (not shown) which serves as an image receptor, by changing over the optical path.

FIG. 11A shows a microfilm F having blip marks B printed in the channel portion in addition to images P. When an image P on this microfilm F is projected on the screen S, the masking unit 40 functions to mask the blip marks B printed in the microfilm F and unnecessary portions of the image P, allowing the remaining portion to be projected on the screen S, as shown in FIG. 11B. The masking unit 40 removably, mounted in the carrier portion 12 of the body 10, and since its masking members 56, 57, 72 and 73 are positioned near and along the upper glass plate 26, these masking members effect masking for the microfilm F directly in close proximity to the film being exposed to light. Consequently, the boundary line between the desired area of the projected image P and the masking area becomes extremely clear in the presence of the masking edges 60, 61, 74 and 75 and thus sharp masking is attained.

Using the retaining members 50, the masking unit 40 is removably mounted to the guide 22 which is provided in the carrier portion 12 of the reader printer body 10. Therefore, the masking unit 40 can be easily mounted and removed with respect to the interior of the body 10, thus permitting easy maintenance and replacement of the masking unit 40. Even with the masking unit 40 removed, the image projecting system can be used. In this case, it is desirable that a spacer of a shape conforming to the shape of the masking unit 40 be fitted in the portion from which the masking unit 40 has been removed.

When the adjusting shaft 62 is turned using the knob 70, the masking members 56 and 57 move in parallel with the axis of the shaft 62 and the masking edges 60 and 61 which are inclined at an angle of 30° with respect to the said axis move symmetrically at an equidistance from the X datum line Ox.

When the adjusting shaft 80 is turned using the knob 87, the masking members 72 and 73 move in parallel with the shaft 80 and the masking edges 74 and 75 which are inclined at an angle of 60° with respect to the said axis move symmetrically at an equidistance from the Y datum line Oy. Further, the position of the Y datum line Oy is changed by turning the knob 78 to move the masking members 72 and 73 in the same direction.

FIG. 12A shows a duo-format type microfilm F with images P1 and P2 recorded in two rows. For projecting an image recorded on such type of microfilm F onto the screen S, the size of the masked area M is preset and the knob 87 is turned, so that the Y datum line Oy moves in the transverse direction of the microfilm F and the masking members are easily shifted so as to mask the images other than those in one row of images P1 or to mask the images other than those in the row of images P2.

Thus, according to the present invention the shape, size and position of the masking area M can be shifted, changed and set as desired according to the desired portion of each image P.

The foregoing operation for the knobs 70, 78 and 87 is performed from the front side of the reader printer body 10. In the case where these knobs are positioned on a side portion of the body 10, they can be operated without impeding the operation of the operating boards B1 and B2 which are provided on the front side of the body 10.

Since the masking members are disposed near the microfilm, the boundary line between the portion projected on the image receptor and the masked portion becomes clear and sharp, and a desired area is projected on the screen and copied. The copy thus obtained is free of unnecessary characters, etc. and even when the microfilm is a negative film, the black frame is not copied.

While this invention has been illustrated and described in accordance with a preferred embodiment, it is recognized that variations and changes may be made and equivalents employed herein without departing from the invention as set forth in the claims.

What is claimed is:

1. An image projecting system employing a microfilm wound on a supply reel incorporated in a cartridge and projecting an image recorded on the microfilm onto an image receptor by irradiating the microfilm at a projecting position with light emitted from a light source, comprising:
    a housing having opposite side walls, a front face, and an angled wall positioned between one of said side walls and the front face, said angled wall being positioned at an angle with respect to said front face and said one side wall;
    a receiving port for receiving said cartridge located in said angled wall;
    a supply reel drive mechanism provided in the vicinity of said receiving port for driving the supply reel in the cartridge received in the receiving port;
    a take-up reel for taking up the microfilm conveyed from said supply reel, said take-up reel located at a distance from the front face of the housing at a side of said housing opposite one side wall so that a conveyance path for the microfilm extends inwardly diagonally across the housing from the receiving port, said diagonal conveyance path creating a space on each side of the conveyance path;
    a take-up reel drive mechanism provided in the vicinity of said take-up reel for driving the take-up reel, wherein the microfilm passing said projecting position is conveyed between said supply and take-up reels at an angle with respect to the front face of said housing.

2. An image projecting system according to claim 1, wherein said supply reel drive mechanism is disposed at a side of said conveyance path opposite the front face of said housing.

3. An image projecting system according to claim 1, wherein said take-up reel drive mechanism is disposed between said take-up reel and the front face of said housing.

4. An image projecting system employing a microfilm wound on a supply reel incorporated in a cartridge and projecting an image recorded on the microfilm at a projecting position with light emitted from a light source, comprising:
    a housing having opposite side walls, a front face, and an angled wall positioned between one of said side walls and the front face, said angled wall being positioned at an angle with respect to said front face and said one side wall;
    a receiving port for receiving said cartridge located in said angled wall;
    a take-up reel for taking up the microfilm conveying from said supply reel, said take-up reel being located apart from the front face of the housing so that a conveyance path of the microfilm extends inwardly from the receiving port at the front face of the housing to said take-up reel;
    a supply reel drive mechanism disposed at a side of said conveyance path opposite the front face of said housing for driving the supply reel in the cartridge received in the receiving port; and
    a take-up reel drive mechanism disposed between said take-up reel and the front face of said housing,
    wherein the microfilm, while passing said projecting position, is conveyed between said supply and take-up reels along a horizontal path at an angle with respect to the bottom of the front face of said housing.

5. An image projecting system as claimed in claim 4 wherein said receiving port and said take-up reel are positioned on opposite sides of the housing.

6. An image projecting system employing a microfilm wound on a supply reel incorporated in a cartridge and projecting an image recorded on the microfilm at a projecting position with light emitted from a light source, comprising:
    a housing having opposite side walls, a front face, and an angled wall positioned between one of said side walls and the front face, said angled wall being positioned at an angle with respect to said front face and said one side wall;
    a receiving portion for receiving said cartridge located at a position in the vicinity of a front face of the housing, said receiving portion including an insertion port located in aid angled wall for inserting the cartridge into the receiving portion;
    a take-up reel for taking up the microfilm conveyed from a supply reel, said take-up reel being located apart from the front face of the housing so that a conveyance path of the microfilm extends inside the housing from said receiving portion;
    a supply reel drive mechanism, including a first motor disposed at a side of said conveyance path opposite to the front face of the housing, for driving the supply reel int eh cartridge receiving in the receiving portion; and a take-up reel drive mechanism including a second motor, disposed between said take-up reel and the front face of said housing, for driving the take-up reel;

wherein the microfilm, while passing said projecting position, is conveyed between said supply and take-up reels at an acute angle with respect to the front face of said housing, in order that the side-to-side width of the housing be relatively small in comparison with the length of the conveyance path of the microfilm.

7. An image projecting system as claimed in claim 6 wherein said receiving portion and said take-up reel are positioned on opposite sides of the housing.

* * * * *